Figure 1:
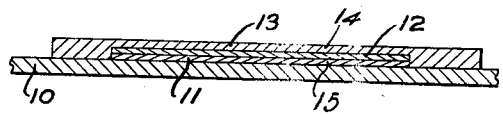

Aug. 13, 1940.     J. H. CAHOON ET AL     2,210,879
REVEALABLE IMAGE
Filed May 19, 1937

INVENTORS.
JOSEPH H. CAHOON
LOUIS P. HALL
VAN R. PETERSON
BY
ATTORNEY.

Patented Aug. 13, 1940

2,210,879

UNITED STATES PATENT OFFICE 2,210,879

REVEALABLE IMAGE

Joseph H. Cahoon, Mill Valley, Louis P. Hall, Oakland, and Van R. Peterson, Mill Valley, Calif.

Application May 19, 1937, Serial No. 143,420

2 Claims. (Cl. 35—49)

This invention relates to the art of printing and has for one of its objects the printing of a revealable image on paper or any other suitable surface.

It is an object of this invention to provide simple means whereby an image may be imprinted on the preferred surface, such basic image to be concealed by the overprinting or superimposition of a masking coat, that portion of the masking coat overlying the basic image to be removed by simply rubbing the designated area. It is another object of the invention in providing means whereby the basic image may be brought out in such sharp detail as is consistent with good printing practice.

It is a further object of the invention to provide an article of the character described in which the masking coat, concealing the basic image, may carry an image having, if desired, relation to the revealable or basic image.

It is also an object of this invention in providing means to insure certain economical practices in carrying out the objects of the invention.

Other objects and advantages will become apparent as this specification proceeds.

Figure 2:
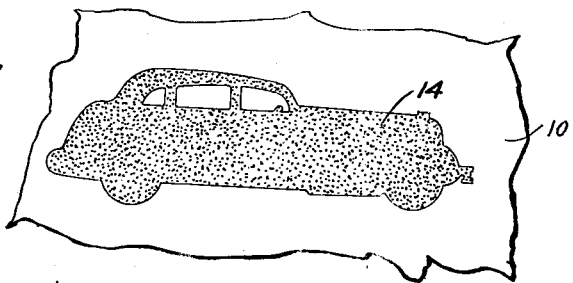
Figure 3:
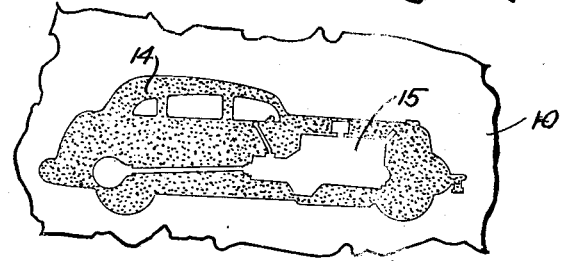
Figure 4:
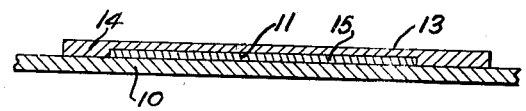
Figure 5:
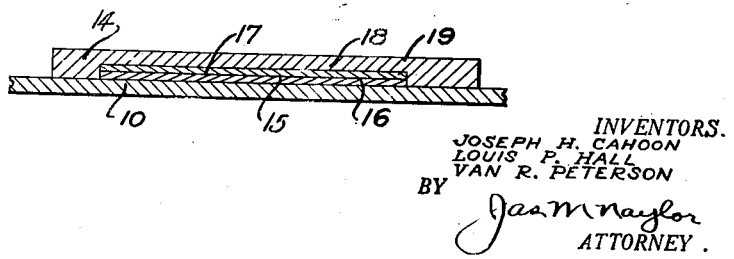

In the drawing forming a part of this application:

Figure 1 is a greatly magnified cross-section of one example of the subject matter of this invention, Figure 2 is a plan view of a representative image on the top surface of that which is represented in Figure 1, Figure 3 is a plan view illustrating the transformation of the image of Figure 2 to reveal the theretofore concealed image, Figure 4 is a greatly magnified cross-section of an example of a modification of this invention, and Figure 5 is a cross-section view, similar to Figure 4, of an example of a further modification of the invention.

In the drawing, the numeral 10 designates the paper or other preferred surface to be treated by the subject matter hereof. The basic or revealable image 11, is printed on the surface 10 in the desired color. Next, the image 11, or that portion thereof which is desired to be ultimately revealed, is covered with a film of clear varnish, or any similar crystallizing substance, 12.

The next step, in the process, is to superimpose upon the basic concealed image 11, and the affected surrounding area of the surface of the sheet, the surface image, or that image which will be first observed by the reader. The surface image is here designated by the numeral 13.

It will be seen that the results of the foregoing steps consist of a surface image 13 which is viewed by the observer as an entirety, concealing (in the example illustrated in Figure 1 of the drawing) a smaller image 11 which can be revealed to the reader by rubbing his finger over the surface of the image 13 or a designated portion thereof. This is rendered possible by virtue of the fact that the ink used in imprinting image 13 did not bond with the varnish or other crystallizing substance 12, or with the basic image 11, although it did bond with or impregnate the surface 10. Thus that part of the surface image 13 which is superimposed over the protective coat 12 is removable by simply rubbing the specific area.

In Fig. 2 of the drawing the surface image 13 has been given the shape of the motor car 14. In Fig. 3 the concealed image 11 has been given the shape of the motor, differential and transmission, generally designated by the numeral 15 of the motor car 14, as revealed to the reader of the advertisement when portions of the surface image 14 are rubbed away.

In Figure 4 of the drawing there is illustrated a modification of the hereinbefore described invention. Here the concealed image 11, again taking the form of the motor, differential and transmission 15 of the motor car 14, is printed directly on the surface 10 in a medium such as a colored varnish. Then the surface image 13 is superimposed thereupon, covering a greater area on the surface 10 than the basic image 11 and bonding with the material of said surface 10 but not the material of image 11. Here again the image 11 is revealed by frictionally removing that portion of the image 13, specifically the motor car 14, immediately overlying image 11.

In Figure 5 another modification is shown. In this particular instance the object to be concealed, again using the motor, differential and transmission 15, is printed in the desired color through the medium of a colored varnish or other crystallizing substance, designated by the numeral 16. If preferred, the article illustrated in Figure 1 and hereinbefore described may be utilized and the basic image 16 protected by a clear varnish coat such as designated by the numeral 12. The image 16, or the clear varnish coating, therefore, as the case may be, is then covered with one or more coats of an opaque white ink 17, having properties repellent to the image 16, or the clear varnish coat 12, to partially mask the object to be concealed. Superimposed upon the white coat 17 is a coat of completely opaque metallic ink 18, such as silver, gold or the like. This metallic coat provides a printing surface upon which half tones or other open subjects may be printed. It is also important that multicolor subjects may be utilized in this step. The surface image, in this particular modification, is indicated by the reference numeral 19, again taking the form of the motor car 14, as being overprinted on the metallic ink surface 18.

It will now be understood that all of the inks superimposed upon the metallic ink coat 18, and the underlying white opaque coat 17 bond together, thus permitting removal of all of the films which are superimposed upon the image 16, if the latter be imprinted in a colored varnish or from the clear varnish coat 12 if the same be used.

In the article illustrated in Figure 1 of the drawing the varnish coat 12 is applied while in a fluid state and upon drying bonds with the ink of the printed image 11. The overprinted image 13 is applied after the varnish coat 12 has been permitted to dry.

The ink used in connection with the imprinting of the revealed or surface images 13 and 18 has been mentioned as being of a repellent nature. This desired property can be given all commercial printing inks, save possibly the metallic inks, by the admixture of quantities of mineral oil and castor oil, or any clear substance having the properties thereof which will permit the ink with which it is combined to dry slowly and maintain the desired repellency. As a matter of fact where a masking coat of varnish has been permitted to dry it has been found that images superimposed thereupon in ordinary inks can be removed by rubbing but the ease with which they may be removed, for the purposes such as those mentioned herein, can be accelerated and controlled with more exactitude by the combining of ingredients such as those mentioned.

It is to be appreciated that the prior art reveals earlier instances of concealed images covered by a surface image, such concealed image to be revealed by various types of treatment of the surface or revealed image. As for example, we are aware of Patent 356,695, dated January 25, 1887, covering a transformation picture and print in which the revealed image is washed with water to disclose the basic image; and Patent 1,232,021, dated July 3, 1917, referring to an educational device in which an image is brought to light by brushing the surface with water and using a blotting material thereon. There are other patents covering similar methods. However, we believe we are the first to devise an article of the character described herein in which a superimposed image, or a portion thereof, may be removed by the expedient of rubbing a designated area with one's finger to reveal a concealed image. Furthermore, our study leads us to believe that none of the prior inventors have given any thought to the perfection of means which will attain results such as will meet the exacting requirements of the modern printing art.

Basically, this invention is unique in the utilization of the varnish or other crystallizing medium which provides a base for printing concealing images and still permits of the easy removal of specific portions of such surface image to reveal an underlying image. Perfect control is had over those portions or details to be later removed; for example, delicate traceries, the common ben-day or half-tone screens, or other open subjects.

It will be understood and appreciated that the uses of such an article will be many. As for instance, the article heretofore described can be employed to illustrate the benefits of using various types of cleansers by the so-called "before and after pictures," or the same may be employed in any instance wherein an element of like comparison or surprise would be desirable.

Having thus described our invention, what we claim and desire to secure by grant of Letters Patent is:

1. An article of manufacture consisting of a base sheet, a basic image disposed upon the surface thereof, a transparent protective varnish coating therefor, a masking coat for said image superimposed on said transparent protective coating, said masking coat being characterized by its repellency to said protective varnish coating, and a surface image superimposed upon said masking coat.

2. An article of manufacture consisting of a base sheet, a basic image disposed upon the surface thereof, a clear varnish coating therefor, and a removable masking coat on the clear varnish coating.

JOSEPH H. CAHOON.
LOUIS P. HALL.
VAN R. PETERSON.